United States Patent
Lee

(10) Patent No.: US 9,764,869 B2
(45) Date of Patent: Sep. 19, 2017

(54) VACUUM PACKAGING DEVICE HAVING A MOISTURE-SENSING CAPABILITY

(75) Inventor: Kyul-Joo Lee, Chungcheongnam-do (KR)

(73) Assignees: Kyul-Joo Lee, Chungcheongnam-do (KR); ROLLPACK CO., LTD., Gyeonggi-do (KR)

(*) Notice: Subject to any disclaimer, the term of this patent is extended or adjusted under 35 U.S.C. 154(b) by 849 days.

(21) Appl. No.: 14/113,842

(22) PCT Filed: Apr. 26, 2012

(86) PCT No.: PCT/KR2012/003231
§ 371 (c)(1),
(2), (4) Date: Oct. 25, 2013

(87) PCT Pub. No.: WO2012/148186
PCT Pub. Date: Nov. 1, 2012

(65) Prior Publication Data
US 2014/0041336 A1 Feb. 13, 2014

(30) Foreign Application Priority Data

Apr. 26, 2011 (KR) .................. 10-2011-0039034
Jun. 8, 2011 (KR) .................. 10-2011-0055142
Apr. 23, 2012 (KR) .................. 10-2012-0042197

(51) Int. Cl.
*B65B 57/00* (2006.01)
*B65B 31/04* (2006.01)
*B65B 51/14* (2006.01)

(52) U.S. Cl.
CPC ............ *B65B 57/00* (2013.01); *B65B 31/048* (2013.01); *B65B 51/146* (2013.01)

(58) Field of Classification Search
CPC ..... B65B 51/156; B65B 31/048; B65B 57/00; B65B 31/043; B65B 57/005
(Continued)

(56) References Cited

U.S. PATENT DOCUMENTS 7,162,927 B1 1/2007 Selvan et al.
2005/0039420 A1* 2/2005 Albritton ............. B65B 31/046
53/432
(Continued)

FOREIGN PATENT DOCUMENTS

CN 2866339 2/2007
CN 101195418 6/2008
(Continued)

OTHER PUBLICATIONS

State Intellectual Property Office of P.R. China (English Translation) Office Action, Dated Sep. 5, 2014, Issued in the corresponding Chinese Application No. 201280031170.5.
(Continued)

*Primary Examiner* — Robert Long
*Assistant Examiner* — Xavier A Madison
(74) *Attorney, Agent, or Firm* — Dority & Manning, P.A.

(57) ABSTRACT

There is provided a moisture-sensitive vacuum packing machine, and particularly, there is provided a moisture-sensitive vacuum packing machine for sensing moisture within a chamber. The moisture-sensitive vacuum packing machine includes: a device housing having a controller and a vacuum driving unit; a chamber unit positioned above the device housing and having a first chamber and a second chamber whose interiors are vacuumized when the vacuum driving unit operates; and a sensing unit installed in the chamber unit such that it is associated with the controller, and sensing the presence or absence of moisture within the second chamber according to whether the sensing unit comes into contact with the second chamber.

14 Claims, 13 Drawing Sheets

(58) Field of Classification Search
USPC .................. 53/52, 79, 512, 507; 73/170.23; 116/227, 229; 388/929
See application file for complete search history.

(56) References Cited

U.S. PATENT DOCUMENTS

| | | |
|---|---|---|
| 2005/0050860 A1 | 3/2005 | Sung |
| 2006/0053748 A1 | 3/2006 | Ahn et al. |
| 2010/0281989 A1 | 11/2010 | Kim et al. |

FOREIGN PATENT DOCUMENTS

| | | |
|---|---|---|
| CN | 201214493 | 4/2009 |
| JP | H09-207908 | 12/1997 |
| JP | 2009-226012 A | 10/2009 |
| KR | 10-0148537 B1 | 1/1998 |
| KR | 1020020078477 | 10/2002 |
| KR | 20-0219700 Y1 | 7/2003 |
| KR | 10-0451391 B1 | 12/2004 |
| KR | 10-0494053 B1 | 8/2005 |
| KR | 10-0574381 B1 | 9/2005 |
| KR | 1020050088704 | 9/2005 |
| KR | 10-0546042 B1 | 1/2006 |
| KR | 10-0653443 B1 | 2/2006 |
| KR | 10-2008-0087119 A | 9/2008 |
| KR | 10-0964923 B1 | 6/2010 |

OTHER PUBLICATIONS

European Search Report, for Application No. EP 12776443, dated Oct. 30, 2014.

\* cited by examiner

VACUUM PACKAGING DEVICE HAVING A MOISTURE-SENSING CAPABILITY

CROSS REFERENCE TO RELATED APPLICATIONS

This application is the U.S. National Stage entry of International Application Number PCT/KR2012/003231 filed under the Patent Cooperation Treaty having a filing date of Apr. 26, 2012, which claims priority to Korean Patent Application Serial Numbers 10-2011-0039034, filed on Apr. 26, 2011, 10-2011-0055142, filed on Jun. 8, 2011, and 10-2012-0042197, filed on Apr. 23, 2012, all of which are hereby incorporated herein by reference in their entirety for all purposes

TECHNICAL FIELD

The present invention relates to a moisture-sensitive vacuum packing machine, and more particularly, to a moisture-sensitive vacuum packing machine capable of sensing whether moisture is present within a chamber.

BACKGROUND ART

A vacuum packing machine is formed with an upper case and a lower case being hinge-coupled, and performs vacuum-packing through a vacuum wrapper being placed between the upper case and the lower case and the cases being closed.

In the related art chamber-type vacuum packing machine, an opening portion of a wrapper to be vacuumized is placed in a vacuum chamber, and air within the vacuum chamber is withdrawn therefrom by using a vacuum pump, or the like, to vacuumize the interior of the wrapper.

When vacuum packing using the vacuum pump, or the like, is completed, the opening portion of the wrapper is heat-fused and sealed by hot wires positioned in the upper and lower cases, completing packing. This structure is described in detail in Korean Utility Model Registration No. 20-0319700, and the like.

Meanwhile, in case of vacuum-packing a food item or food ingredients containing moisture to some extent, moisture contained in the food item or food ingredients, or the like, is withdrawn together with air, and a partial amount of moisture withdrawn through the foregoing process may be withdrawn into the vacuum pump together with air, while a remaining amount of moisture may be gathered in the chamber.

The moisture gathered in the chamber may stagnate or bacteria (or germs) may propagate therein with the passage of time. Vacuum-packing a new food item or food ingredients with contaminated moisture remaining in the chamber may not be sanitary. In addition, during vacuum-packing, moisture present within the chamber may be withdrawn into the vacuum pump through a vacuum intake to damage the vacuum pump, resulting in a breakdown of the vacuum packing machine.

Meanwhile, a pressure sensor, an element for measuring pressure in a process or a system, is a sensor having various purposes and which is used extensively, such as in industrial measurement, automatic control, in the medical field, vehicle engine control, environmental control, in electric products, and the like.

A measurement principle of a pressure sensor uses displacement, deformation, a magnetic-thermal conduction rate, an amount of vibrations, and the like, and various types of pressure sensors have been put to practical use.

Pressure sensors include a mechanical pressure sensor using a Broudon Tube, a diaphragm, a bellows, and the like, an electromagnetic pressure sensor having a portion thereof for converting a mechanical displacement into an electrical signal, a semiconductor-type pressure sensor, and the like.

FIG. 13 illustrates an example of a mechanical pressure sensor measuring air pressure.

The pressure sensor illustrated in FIG. 13 has a function of generating an electrical signal to interrupt a current or to allow a current to flow, at a particular pressure.

Referring to FIG. 13, in the related art pressure sensor, a sealing member 60 is installed in an internal space between a lower housing 10 and an upper housing 70, and a conductive member 50 having electrical conductivity is attached below the sealing member 60. For example, the conductive member 50 may be attached to the sealing member 60 as an insertion protrusion (not shown) of the sealing member 60 is inserted into a connection hole 51 formed in the center of the conductive member 50.

An elastic member 40 having a coil spring shape and providing elastic force to the conductive member 50 and the sealing member 60 is disposed above the lower housing 10.

Also, a pair of connection members 20 are installed in a penetrating manner and are electrically connected to the conductive member 50 when the conductive member 50 descends in response to elastic force of the elastic member 40. In this case, in order to make heights of the connection members 20 uniform when in contact with the conductive member 50, the connection members 20 are exposed from the lower housing 10 through insertion protrusions formed to be protruded from an upper portion of the lower housing 10.

The sealing member 60 cuts off air flow between lower and upper sides thereof, and the upper housing 70 has an air flow hole 71 formed therein to allow ambient air to be introduced to an upper space of the sealing member 60.

The related art pressure sensor may be used to measure air pressure, and an operation thereof in a case in which an air intake operation is performed by using a vacuum pump in a vacuum packing machine, a vacuum processor, a vacuum chamber, and the like will be described.

In the pressure sensor, an air inlet tube 11 is connected to a vacuum line in which a vacuum operation is performed. When air is withdrawn by a vacuum pump (not shown), air present in the space between a lower side of the sealing member 60 and the lower housing 10 is withdrawn out to lower pressure.

As pressure in the space is lowered, the sealing member 60 descends, while overcoming elastic force of the elastic member 400, and when pressure in the space reaches a pre-set pressure level, the conductive member 50 attached to a lower portion of the sealing member 60 comes into contact with the connection members 20.

Accordingly, the pair of connection members 20 are electrically connected to transmit an electrical signal outwardly. On the basis of the electrical signal, an operation of the vacuum pump (not shown) may be stopped.

In this manner, in the related art pressure sensor, when air pressure in the vacuum line is lowered to below a predetermined pressure level, an electrical signal is transmitted to stop an operation of the vacuum pump.

Meanwhile, when the operation of the vacuum pump is stopped after the vacuum operation is completed, or when ambient air is introduced to the vacuum line because a vacuum operation is not performed, the sealing member 60 descends to release contact between the conductive member 50 and the connection members 20.

In this case, since the vacuum line and the interior of the pressure sensor communicate to allow air to flow therein, moisture, foreign objects, and the like, may thus be introduced to the interior of the pressure sensor. The introduction of moisture, and the like, may frequently occur when a vacuum state within the pressure sensor is abruptly released and ambient air is rapidly introduced thereto.

When moisture, foreign objects, and the like, are introduced to the interior of the pressure sensor, descending of the sealing member 60 may be interfered with or contact between the connection members 20 and the conductive member 50 may be defective, resulting in complete loss of the function of the pressure sensor.

The problem in which moisture, foreign objects, are introduced to the interior of the pressure sensor is not limited to a pressure sensor that reacts under particular pressure as illustrated FIG. 13, and may also arise in the same manner even in a pressure sensor for measuring pressure in a predetermined range.

Also, a pressure sensor for measuring air pressure, including an electric pressure sensor, as well as a mechanical pressure sensor, may have the foregoing problem.

In order to address the problem, Korean Patent Laid-Open Publication. No. 2009-31180 discloses a technique of preventing moisture or foreign objects being introduced through a separate membrane member, or the like, but such a configuration requires additional components, making the configuration complicated and making it difficult to assemble the components.

Thus, a technique capable of guaranteeing a stable operation of a pressure sensor, which has a simple configuration and is easily assembled so as to be commonly used in a vacuum packing machine, or the like, to measure air pressure, by preventing the introduction of moisture or foreign objects into the interior of the pressure sensor, is required.

DISCLOSURE

Technical Problem

An aspect of the present invention provides a moisture-sensitive vacuum packing machine capable sensing moisture within a chamber.

An aspect of the present invention also provides a moisture-sensitive vacuum packing machine having a dual-chamber structure allowing moisture from within a chamber to be easily removed.

An aspect of the present invention also provides a moisture-sensitive vacuum packing machine in which a chamber unit is slidably coupled to a device housing, whereby the chamber unit can be easily separated from the device housing.

An aspect of the present invention also provides a moisture-sensitive vacuum packing machine including a pressure sensor which has a small amount of components, a simplified configuration, and does not have a possibility of damaging a function of sensing pressure from introduced moisture or foreign objects.

An aspect of the present invention also provides a moisture-sensitive vacuum packing machine including a pressure sensor providing a pressure value as well as stably sensing pressure.

Technical Solution

According to an aspect of the present invention, there is provided a moisture-sensitive vacuum packing machine including: a device housing having a controller and a vacuum driving unit; a chamber unit positioned above the device housing and having a first chamber and a second chamber whose interiors are vacuumized when the vacuum driving unit operates; and a sensing unit installed in the chamber unit such that it is associated with the controller, and sensing the presence or absence of moisture within the second chamber according to whether the sensing unit comes into contact with the second chamber.

Preferably, the sensing unit may sense moisture through a seesaw movement due to moisture introduced to the second chamber.

Preferably, the chamber unit may include a first chamber having a chamber fixing shaft provided in a bottom surface thereof; and a second chamber associated with the chamber fixing shaft to balance weight, and making a seesaw movement when moisture is introduced to the interior thereof.

Preferably, the second chamber may be detachably associated with the chamber fixing shaft.

Preferably, the second chamber may have an internal bottom surface downwardly sloped from one side of the second chamber to the other side thereof to allow moisture within the second chamber to readily flow in any one direction.

Preferably, an external bottom surface of the second chamber is spaced apart from the sensing unit with a predetermined interval therebetween, and the one side and the other side of the second chamber may be associated with the chamber fixing shaft such that they are balanced in weight.

Preferably, when moisture is introduced to the interior of the second chamber, the second chamber may come into contact with the sensing unit provided below the other side of the second chamber, while making a seesaw movement due to a weight of the moisture gathering on the other side thereof.

Preferably, when the sensing unit and the second chamber are in contact, the controller may operate to stop an operation of the vacuum driving unit.

Preferably, the second chamber may be associated with the chamber fixing shaft such that a bottom surface of the second chamber comes into contact with the sensing unit provided below one side of the second chamber.

Preferably, when moisture is introduced to the interior of the second chamber, the second chamber may make a seesaw movement to allow the other side thereof to move downwardly due to a weight of the moisture gathering on the other side of the second chamber, so as to be released from contact with the sensing unit.

Preferably, when the contact between the sensing unit and the second chamber is released, the controller may operate to stop the operation of the vacuum driving unit.

Preferably, the chamber unit may include: a first chamber having a chamber fixing shaft provided on a bottom surface thereof and a moisture inflow opening provided on an upper surface thereof; a connection bar associated with the chamber fixing shaft such that it can make a seesaw movement; a second chamber fixed to one end of the connection bar such that the second chamber is positioned below the moisture inflow opening, to accommodate moisture introduced through the moisture inflow opening; and a balance weight provided in the other end of the connection bar such that it can come into contact with the sensing unit.

Preferably, the second chamber may be moved downwardly due to a weight of moisture introduced through the moisture inflow opening, and the balance weight may be moved upwardly immediately when the second chamber is moved downwardly, so as to be released from contact with the sensing unit.

Preferably, when the sensing unit and the balance weight are released from a contact state, the controller may operate to stop an operation of the vacuum driving unit.

Preferably, the moisture-sensitive vacuum packing machine may further include: a cover having a vacuum intake associated with the vacuum driving unit, and associated with the device housing to move up and down with respect to the device housing when the vacuum driving unit operates.

Preferably, the chamber unit may be detachably associated with the device housing in a sliding manner.

Preferably, the chamber unit may further include: an elastic support member provided between the first chamber and a lower surface of the second chamber accommodated within the first chamber and elastically supporting the second chamber, wherein when the elastic support member is elastically deformed by a weight of moisture introduced to the interior of the second chamber, the second chamber is moved downwardly so as to come into contact with the sensing unit installed below the second chamber.

Preferably, when the sensing unit and the second chamber are in contact, the controller may stop the operation of the vacuum driving unit.

According to another aspect of the present invention, there is provided a moisture-sensitive vacuum packing machine including: a device housing having a controller and a vacuum driving unit; a chamber unit positioned above the device housing and having a first chamber and a second chamber whose interiors are vacuumized when the vacuum driving unit operates; and a sensing unit installed in the chamber unit such that it is associated with the controller, and sensing the presence or absence of moisture within the second chamber, wherein the chamber unit may include: a buoyancy member provided within the second chamber and moving up and down according to a height of moisture introduced to the interior of the second chamber, and an operating bar hinge-coupled to the second chamber and having one end connected to the buoyancy member and the other end coming into contact with or separated from the sensing unit according to a movement of the buoyancy member.

Preferably, the second chamber has an internal bottom surface sloped downwardly from one side of the second chamber and the other side thereof to allow moisture within the second chamber to readily flow in any one direction, and the buoyancy member may be positioned on the other side within the second chamber.

Preferably, when the sensing unit and the operating bar are in contact, the controller may stop an operation of the vibration driving unit.

Preferably, the moisture-sensitive vacuum packing machine may further include: a pressure sensor associated with the chamber unit and sensing or measuring air pressure to sense vacuum of the chamber unit.

Preferably, the pressure sensor may include: a housing configured to have a space portion formed therein; a sealing member having an edge portion fixed to the housing and dividing the space portion within the housing into two or more separated regions and configured as an elastic member; an air communicating unit allowing one region of the space portion and a pressure measurement unit to communicate with each other, and connected to the housing; and an operation sensing unit disposed in the other region of the space portion of the housing and sensing a movement of a central portion of the sealing member according to a change in pressure of the one region of the space portion communicating with the pressure measurement unit.

Preferably, the moisture-sensitive vacuum packing machine may further include: an elastic member disposed between the sealing member and the housing at the one region side to move the sealing member when pressure of the pressure measurement unit is equal to or lower than a pre-set pressure level, wherein the sealing member may include a fixing member configured to fix a position of the elastic member to the central portion.

Preferably, the sealing member may divide the space portion into an upper region and a lower region, the air communicating unit may communicate with the lower region, the operation sensing unit may be a micro-switch disposed in the upper region of the housing, and the sealing member may include a pressing member configured to press the micro-switch of the operation sensing unit when pressure of the pressure measurement unit is equal to or higher than the pre-set pressure level.

Preferably, the sealing member may divide the space portion into an upper region and a lower region, the air communicating unit may communicate with the lower region, the operation sensing unit may be disposed in the upper region of the housing, and the sealing member may be integrally moved together with a variable resistor of the operation sensing unit so that the operation sensing unit may sense pressure through a current value that passes through the variable resistor.

Preferably, the moisture-sensitive vacuum packing machine may further include an adjusting member adjusting elastic force of the elastic member.

Preferably, the housing may be formed as a first housing member and a second housing member are coupled, and the sealing member may be fixed between the first housing member and the second housing member.

Preferably, the adjusting member may include a moving portion supporting one side of the elastic member and screw-coupled to the housing, and a driving portion connected to the moving portion and rotating the moving portion by external force.

Preferably, the sealing member may include: an edge portion fixed to the housing; a central portion moved according to pressure; and a connection portion connecting the edge portion and the central portion and having creases to secure a movement distance of the central portion.

Advantageous Effects

In the case of the moisture-sensitive vacuum packing machine according to an embodiment of the present invention, since the sensing unit is provided in a chamber unit having a dual-chamber structure to sense moisture within the chamber unit, a user may vacuum-pack food ingredients (or materials) in a state in which foreign materials such as moisture, or the like, are not present within the chamber unit as a vacuum space. Thus, food ingredients may be sanitarily vacuum-packed.

Also, according to an embodiment of the present invention, since the chamber unit adopts the dual-chamber structure in which the second chamber is detachably attached to the first chamber, when moisture exists within the second chamber, the second chamber may be separated from the first chamber and moisture existing within the second chamber can be easily removed, enhancing user convenience.

In addition, according to an embodiment of the present invention, the chamber unit is installed in the device housing such that it is detachable from the device housing in a sliding manner. Thus, even in case of a vertical type vacuum packing machine having a structure in which the cover is moved up and down with respect to the device housing, the chamber unit can be easily separated from the device housing to remove moisture within the chamber unit.

Also, according to an embodiment of the present invention, the moisture-sensitive vacuum packing machine including the pressure sensor which has a small amount of components, a simplified configuration, and does not have a possibility of damaging a function of sensing pressure by introduced moisture or foreign objects, can be provided.

Also, according to an embodiment of the present invention, the moisture-sensitive vacuum packing machine including the pressure sensor providing a pressure value as well as stably sensing pressure, can be provided.

BEST MODE

Hereinafter, embodiments of the present invention will be described in detail with reference to the accompanying drawings.

First, embodiments described hereinafter are appropriate for helping to understand the technical features of a moisture sensitive vacuum packing machine of the present invention. However, the present invention is not limited to the embodiments described hereinafter and technical features of the present invention are not limited by the embodiments described hereinafter and may be variously modified within the scope of the present invention.

First Embodiment

The moisture-sensitive vacuum packing machine according to an embodiment of the present invention is a machine which withdraws air from the interior of the packing machine to vacuumize the internal space of the packing machine to thus vacuum-pack food items or food ingredients.

Figure 1:
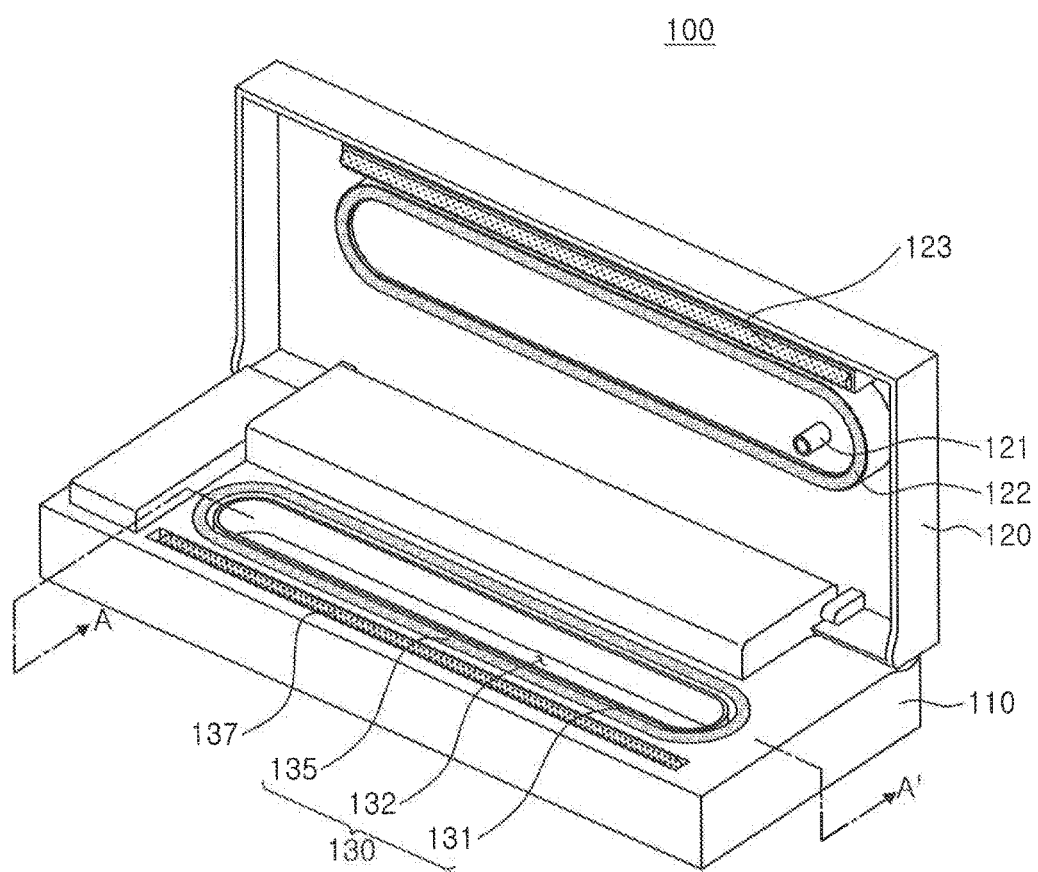
FIG. 1 is a perspective view of a moisture-sensitive vacuum packing machine according to an embodiment of the present invention.

As illustrated in FIGS. 1 and 2, a moisture-sensitive vacuum packing machine 100 according to an embodiment of the present invention includes a device housing 110, a cover 120, a chamber unit 130, a sensing unit 140, a controller 150, and a vacuum driving unit 160.

In an embodiment of the present invention, the device housing 110 includes the chamber unit 130 and a hot wire 137 disposed on an upper portion thereof. The cover 120 provided to cover the chamber unit 130 is associated with the device housing 110.

The hot wire 137 is provided on an upper surface of the device housing 110 in order to seal a wrapper by using a heat sealing method after the wrapper is vacuumized. Meanwhile, the device housing 110 includes the sensing unit 140, the controller 150, and the vacuum driving unit 160 therein, and these components will be described below.

In the present embodiment, the chamber unit 130 includes a first chamber 131 and a second chamber 132 as spaces whose interior is vacuumized when the vacuum driving unit 160 operates. Here, the second chamber 132 is insertedly positioned in the first chamber 131, forming a dual-chamber structure together with the first chamber 131.

In the present embodiment, the first chamber 131 may have a container-like shape with an upper portion thereof opened and a lower portion thereof blocked. The first chamber 131 may be integrally formed with the device housing 110. A chamber sealing member 135 is fixed to an external circumferential surface of the first chamber 131 and provided to correspond to a sealing member 122 of the cover 120 as described hereinafter.

Preferably, the chamber sealing member 135 is made of a material having a degree of elasticity, but any material may be used as long as the chamber sealing member 135 formed thereof is coupled to the sealing member 122 provided in the cover 120 to cut off an introduction of air from an ambient environment. That is, a material of the chamber sealing member 135 and a material of the sealing member 122 of the cover 120 are not particularly limited. For example, the sealing member 122 and the chamber sealing member 135 may be made of sponge capable of cutting off an inflow of ambient air.

Meanwhile, a chamber fixing shaft 133 is provided on a bottom surface of the first chamber 131. Here, the chamber fixing shaft 133 may be a member integrally formed and protruded from the bottom surface of the first chamber 131. Alternatively, the chamber fixing shaft 133 may be fixed to the first chamber 131 by means of a coupling member (e.g., an adhesive, a bolt, a screw, and the like).

Figure 2A:
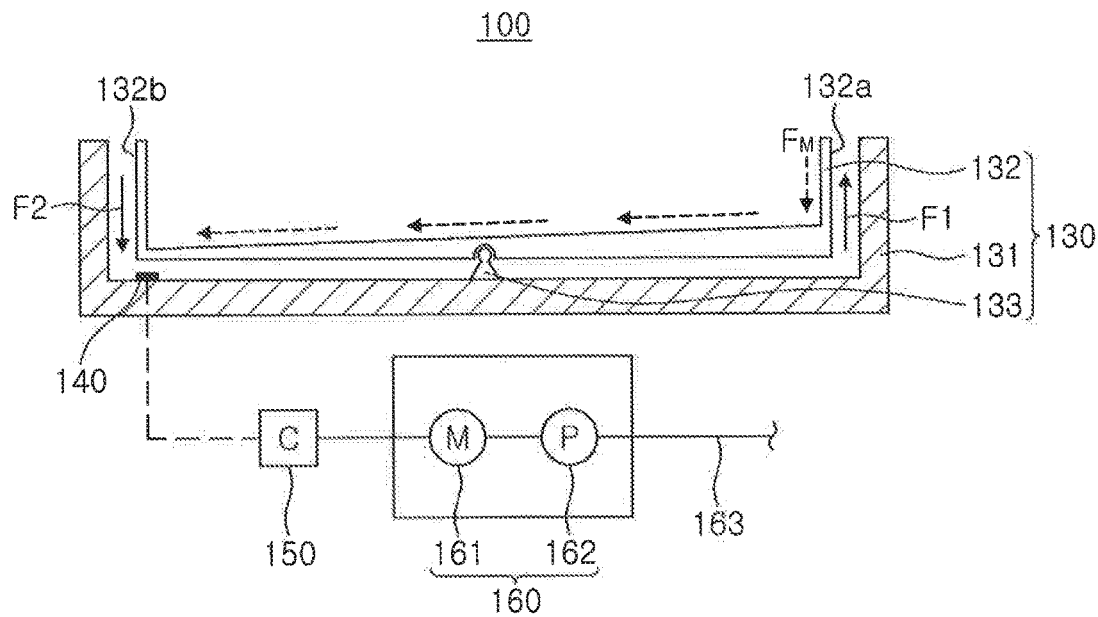
FIG. 2(a) is a view schematically illustrating an example of an internal structure of a chamber unit taken along line A-A' and connection relationships between a sensing unit, a controller, and a vacuum driving unit associated with the chamber unit.

In the present embodiment, the second chamber 132 is detachably installed on the chamber fixing shaft 133. As illustrated in FIG. 2(a), the second chamber 132 may be installed to make a seesaw movement within the first chamber 131.

The second chamber 132 is installed on the chamber fixing shaft 133 such that an external bottom surface thereof is separated from the sensing unit 140 provided on an internal bottom surface of the first chamber 131 in a height direction. In this case, preferably, the second chamber 132 is installed on the chamber fixing shaft 133, balancing weight, such that one side 132a thereof and the other side 132b thereof level off.

In the present embodiment, the second chamber 132 has a shape corresponding to that of the first chamber 131, namely, a container-like shape with an upper portion thereof opened and a lower portion thereof blocked. In this case, however, the second chamber 132 has a size sufficient to be inserted into the first chamber 131.

Also, in the present embodiment, as illustrated in FIG. 2(a), the second chamber 132 may have an internal bottom surface which is a downwardly sloped from the one side 132a of the second chamber 132 to the other side 132b of the second chamber to allow moisture within the second chamber 132 to readily flow in any one direction along the arrows $F_M$.

When the moisture-sensitive vacuum packing machine 100 according to the present embodiment starts to operate to perform vacuum packing, a partial amount of moisture contained in food ingredients is withdrawn into the vacuum pump 162 together with air within a wrapper in which food ingredients are packed. In this case, since a specific gravity of moisture is greater than that of air, a majority of moisture withdrawn into the vacuum driving unit 160 is collected in the second chamber, rather than being withdrawn into the vacuum pump 162, unlike air.

Figure 2B:
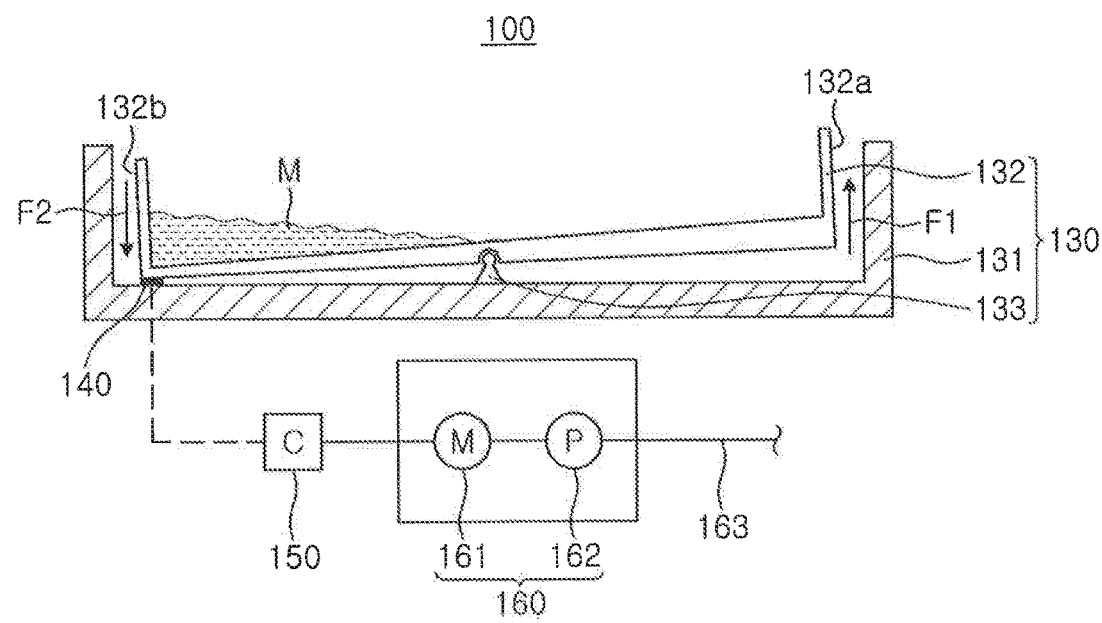
FIG. 2(b) is a view illustrating an operation when moisture is introduced to the chamber unit.

The moisture introduced to the second chamber 132 flows downwardly from the one side 132a of the second chamber 132 to the other side 132b of the second chamber 132 along the sloped bottom surface of the second chamber 132, and is collected in the second chamber 132 on the other side 132b thereof as illustrated in FIG. 2(b).

As illustrated in FIGS. 2(a) and 2(b), due to a weight of the moisture collected on the other side 132h of the second chamber 132, the second chamber 132 makes a seesaw movement with respect to the chamber fixing shaft 133, and accordingly, the one side 132a of the second chamber 132 moves upwardly in a direction of the arrow F1 and the other side 132b of the second chamber 132 moves downwardly in a direction of the arrow F2 to be brought into contact with the sensing unit 140 provided in a lower side of the other side 132b of the second chamber 132.

In the present embodiment, the sensing unit 140 is a member provided to sense the presence or absence of moisture within the second chamber 132 according to whether the sensing unit 140 comes into contact with the second chamber 132. In the present embodiment, the sensing unit 140 may operate when it comes into contact with the second chamber 132. Also, the sensing unit 140 is electrically connected to the controller 150.

When the sensing unit 140 operates, the controller 150 may operate to stop an operation of the vacuum driving unit 160. In this case, the controller 150 is associated with a vacuum motor 161 of the vacuum driving unit 160 to control the operation of the vacuum motor 161.

In the present embodiment, the vacuum driving unit 160 includes a vacuum pump 162 provided to withdraw air thereinto and the vacuum motor 161 provided to drive the vacuum pump 162. The vacuum pump 162 is associated with a vacuum intake 121 provided within the cover 120 by means of a vacuum hose 163.

The vacuum pump 162 is electrically connected to the vacuum motor 161, so when, the vacuum motor 161 rotates, the vacuum pump 162 operates to withdraw air present in the chamber unit 130 through the vacuum intake 121 provided in the cover 120.

As illustrated in FIG. 1, in the present embodiment, the cover 120 is associated with the device housing 110 to cover the chamber unit 130. The sealing member 122, a contact bar, and the vacuum intake 121 are provided on the internal surface of the cover 120.

Here, the sealing member 122 is provided to completely seal the chamber unit 130. Preferably, the sealing member 122 is installed on the internal surface of the cover 120 such that it corresponds to the chamber sealing member 135 provided on the external circumferential surface of the first chamber 131.

In the present embodiment, the contact bar is a member which comes into contact with the hot wire 137 when a wrapper is heat-sealed, to seal the wrapper. Thus, preferably, the contact bar according to the present embodiment is installed on the internal surface of the cover 120 to correspond to the hot wire 137 provided in the device housing 110.

Meanwhile, in the present embodiment, preferably, the vacuum intake 121 is provided on the internal surface of the cover 120 and positioned in the space of the chamber unit 130 in order to readily withdraw air within the chamber unit 130 when the cover 120 is positioned to cover the chamber unit 130.

In the present embodiment, the vacuum intake 121 is associated with the vacuum pump 162 through the vacuum hose 163. Air within the chamber unit 130, namely, the first chamber 131 and the second chamber 132, is withdrawn into the vacuum pump 162 through the vacuum intake 121 to vacuumize the chamber unit 130.

Hereinafter, an operational state of the chamber unit 130 according to the presence or absence of moisture within the chamber unit 130 will be described with reference to FIGS. 2(a) and 2(b).

The present embodiment may not be applied to all the cases of using the moisture-sensitive vacuum packing machine 100 according to the present embodiment, but may be applicable to a case in which food ingredients containing a degree of moisture are vacuum-packed.

In the case of vacuum-packing food ingredients containing a degree of moisture, when the vacuum pump 162 operates, a partial amount of moisture of food ingredients may be controlled to be introduced together with air to the chamber unit 130 as described above. In this case, since a specific gravity of air is greater than that of moisture withdrawn into the chamber unit 130 together with air, a relatively large amount of moisture is dropped into the chamber unit 130 in comparison to an amount of moisture withdrawn into the vacuum pump 162.

Thus, water introduced to the chamber unit 130 flows from the one side 132a of the second chamber 132 to the other side 132b along the sloped bottom surface of the second chamber 132. Thus, as the amount of moisture flowing from the one side 132a of the second chamber 132 to the other side 132b thereof along the bottom surface of the second chamber 132 is increased, the second chamber 132 tilts in a direction in which moisture is collected, while making a seesaw movement with respect to the chamber fixing shaft 133.

As illustrated in FIG. 2(b), as the one side 132a of the second chamber 132 moves upwardly in the direction of the arrow F1 and the other side 132b of the second chamber 132 moves downwardly in the direction of the arrow F2, the second chamber 132 is brought into contact with the sensing unit 140 positioned below the other side 132b of the second chamber 132.

In the present embodiment, when the sensing unit 140 is brought into contact with the second chamber 132, the sensing unit 140 senses moisture within the second chamber 132. When the sensing unit 140 operates, the controller 150 electrically connected to the sensing unit 140 may operate to display information regarding the presence of moisture within the second chamber 132 on a display window provided in the cover 120. Alternatively, when the sensing unit 140 operates, the controller 150 may operate to stop the operation of the vacuum driving unit 160.

Second Embodiment

Figure 3A:
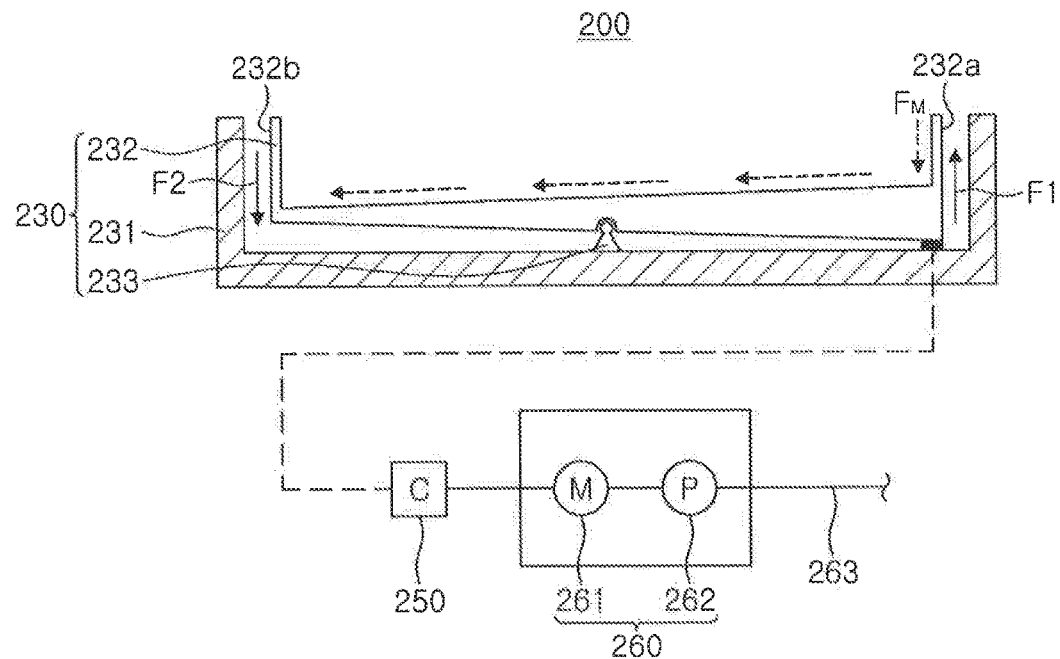
FIG. 3(a) is a view schematically illustrating another example of an internal structure of a chamber unit taken along line A-A' and connection relationships between a sensing unit, a controller, and a vacuum driving unit associated with the chamber unit.
Figure 3B:
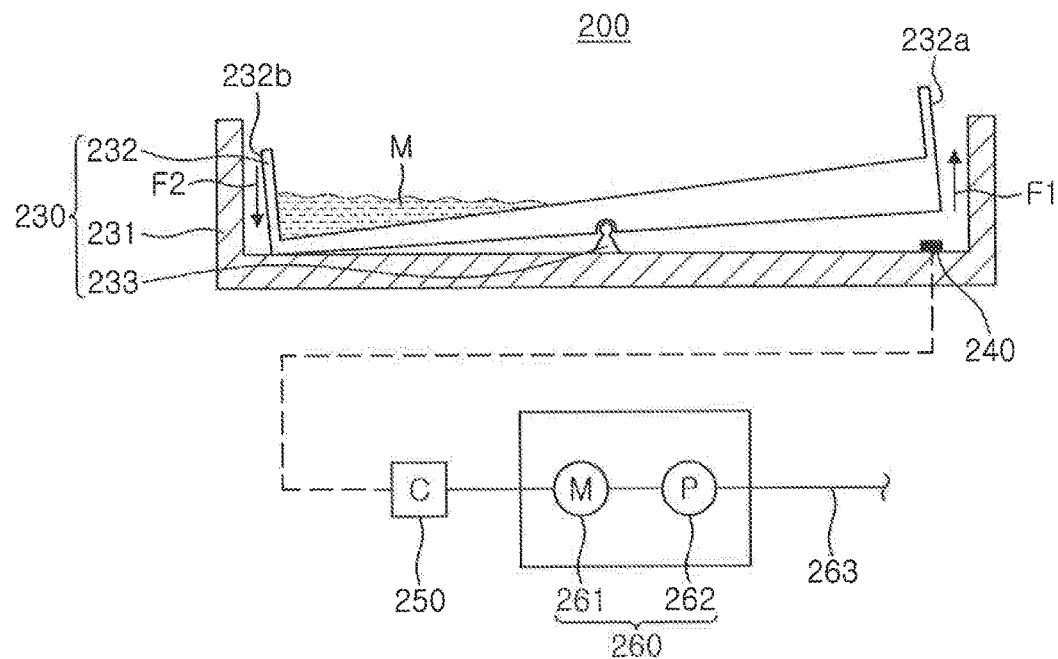
FIG. 3(b) is a view illustrating an operation when moisture is introduced to the chamber unit.

Hereinafter, a moisture-sensitive vacuum packing machine according to a second embodiment of the present invention will be described with reference to FIGS. 3(a) and 3(b). FIG. 3(a) is a view schematically illustrating another example of an internal structure of a chamber unit taken along line A-A' and connection relationships between a sensing unit, a controller, and a vacuum driving unit associated with the chamber unit, and FIG. 3(b) is a view illustrating an operation when moisture is introduced to the chamber unit.

A moisture-sensitive vacuum packing machine 200 according to the present embodiment includes a device housing, a cover, a sensing unit 240, a controller 250, a vibration driving unit 260 including a vacuum motor 261, a vacuum pump 262, and vacuum holes 263 associating a vacuum intake and the vacuum pump 262, and the like, which have the same structures and functions as those of the components of the first embodiment as described above, so a repeated description thereof will be omitted.

Hereinafter, a structure of the chamber unit 230 and an operating method of the sensing unit 240, which are slightly different from those of the chamber unit 130 and the sensing unit 140 of the first embodiment as described above, will be described.

In the present embodiment, the chamber unit 230 includes a first chamber 231, a chamber fixing shaft 233, and a second chamber 232, like the first embodiment as described above. Here, preferably, the first chamber 231 and the chamber fixing shaft 233 have the same structure and shape as those of the first embodiment as described above, so in the present embodiment, a repeated description of the first chamber 231 and the chamber fixing shaft 233 will be omitted.

As illustrated in FIG. 3(a), in the present embodiment, preferably, an internal bottom surface of the second chamber 232 is sloped downwardly from one side 232a of the second chamber 232 and the other side 232b of the second chamber 232 to allow moisture within the second chamber 232 to readily flow downwardly in any one direction.

Also, in the present embodiment, the second chamber 232 is detachably installed on the chamber fixing shaft 233 and makes a seesaw movement within the first chamber 231. However, unlike the first embodiment as described above, the second chamber 232 according to the present embodiment is associated with the chamber fixing shaft 233 such that it is brought into contact with the sensing unit 240 provided in a lower portion of the one side 232a of the second chamber 232 when moisture equal to or greater than a predetermined amount does not exist within the second chamber 232.

In the present embodiment, when moisture is introduced to the second chamber 232, the moisture flows along the sloped bottom surface of the second chamber 232 to gather on the other side 232b of the second chamber 232 as illustrated in FIG. 3(a), the one side 232a of the second chamber 232 moves upwardly in the direction of the arrow F1 so as to be released from contact with the sensing unit 240, and the other side 232b of the second chamber 232, making a seesaw movement with respect to the chamber fixing shaft 233, moves downwardly in the direction of the arrow F2.

In the present embodiment, when the contact between the second chamber 232 and the sensing unit 240 is released according to the foregoing operation of the second chamber 232, the controller 250 may determine that moisture exists within the second chamber 232 and display information regarding the presence of moisture within the chamber unit 230 on a display window or may stop an operation of the vacuum driving unit 260.

Third Embodiment

Figure 4:
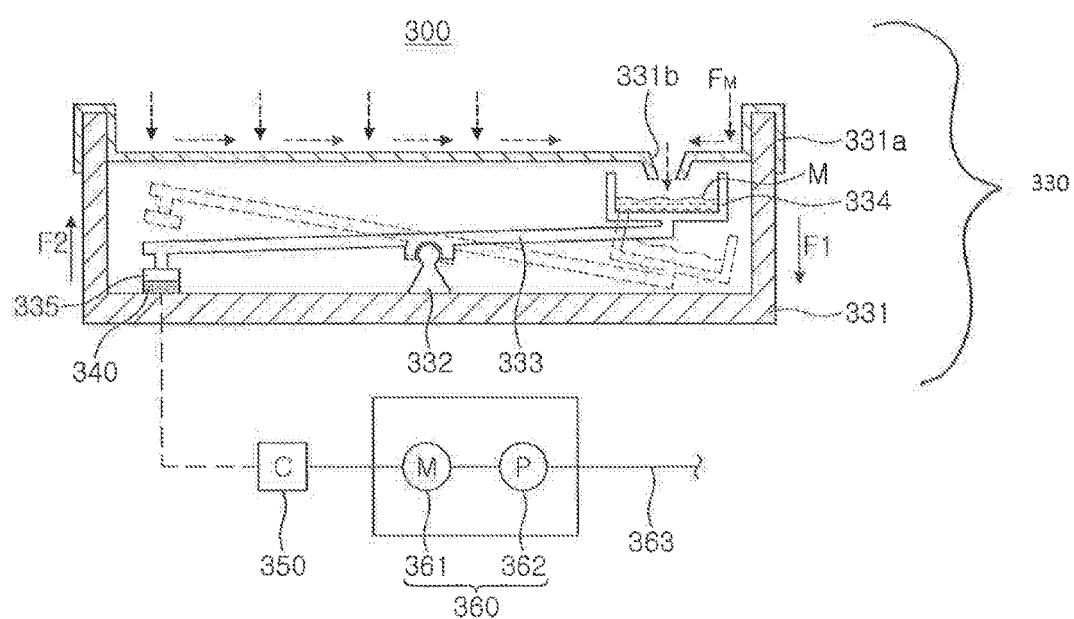
FIG. 4 is a view schematically illustrating another example of an internal structure of a chamber unit taken along line A-A' and connection relationships between a sensing unit, a controller, and a vacuum driving unit associated with the chamber unit.

Hereinafter, a moisture-sensitive vacuum packing machine according to the present embodiment will be described with reference to FIG. 4. FIG. 4 is a view schematically illustrating another example of an internal structure of a chamber unit taken along line A-A' and connection relationships between a sensing unit, a controller, and a vacuum driving unit associated with the chamber unit.

A moisture-sensitive vacuum packing machine 300 according to the present embodiment includes a device housing, a cover, a sensing unit 340, a controller 350, a vibration driving unit 360, and the like, which have the same structures and functions as those of the components of the first embodiment as described above, so a repeated description thereof will be omitted.

Hereinafter, a structure of the chamber unit 330 and an operating method of the sensing unit 340, which are slightly different from those of the chamber unit 130 and the sensing unit 140 of the first embodiment as described above, will be described.

As illustrated in FIG. 4, the chamber unit 330 according to the present embodiment includes a first chamber 331, a chamber fixing shaft 332, a connection bar 333, a second chamber 334, and a balance weight 335.

In the present embodiment, the first chamber 331 includes a first chamber cover 331a detachably coupled to an upper portion thereof, and as the first chamber cover 331a is coupled to the first chamber 331, the interior of the first chamber 331 is hollowed.

Also, a moisture inflow opening 331b is provided in the first chamber cover 331a. Meanwhile, the chamber fixing shaft 332, the connection bar 333, the second chamber 334, and the balance weight 335 are installed within the first chamber 331.

In the present embodiment, the chamber fixing shaft 332 having the same form, shape, and/or structure as that of the first embodiment as described above may be installed on the bottom surface of the first chamber 331. The connection bar 333 may be installed on the chamber fixing shaft 332 according to the present embodiment such that it makes a seesaw movement.

In the present embodiment, the second chamber 334 positioned below the moisture inflow opening 331b is fixed to one end of the connection bar 333, and the balance weight 335 is fixed to the other end of the connection bar 333. In the present embodiment, when moisture equal to or greater than a predetermined amount does not exist within the second chamber 334, a weight of the balance weight 335 is greater than that of the second chamber 334, and the connection bar 333 makes a seesaw movement with respect to the chamber fixing shaft 332 according to whether moisture equal to or greater than a predetermined amount exists within the second chamber 334.

In the present embodiment, the sensing unit 3340 is disposed on the bottom surface of the first chamber 331 such that it comes into contact with the balance weight 335 and electrically connected to the controller 350.

In the present embodiment, when moisture does not exist within the second chamber 334, the sensing unit 340 is maintained in a state of being in contact with the balance weight 335. Thus, when moisture flows into the second chamber 334 and gathers as more than a predetermined amount, the second chamber 334 moves downwardly in the direction of the arrow F1, the connection bar 333 makes a seesaw movement with respect to the chamber fixing shaft 332, and the balance weight 335 moves upwardly in the direction of the arrow F2 to release contact between the sensing unit 340 and the balance weight 335, then, the sensing unit 340 according to the present embodiment may sense moisture within the chamber unit 330.

Fourth Embodiment

Hereinafter, a moisture-sensitive vacuum packing machine according to a fourth embodiment of the present invention will be described with reference to FIGS. 5 and 6. Here, FIG. 5 is a view schematically illustrating a chamber unit separated from a device housing in a moisture-sensitive vacuum packing machine according to the present embodiment, and FIG. 6 is an assembled perspective view of the moisture-sensitive vacuum packing machine according to the present embodiment.

Figure 5:
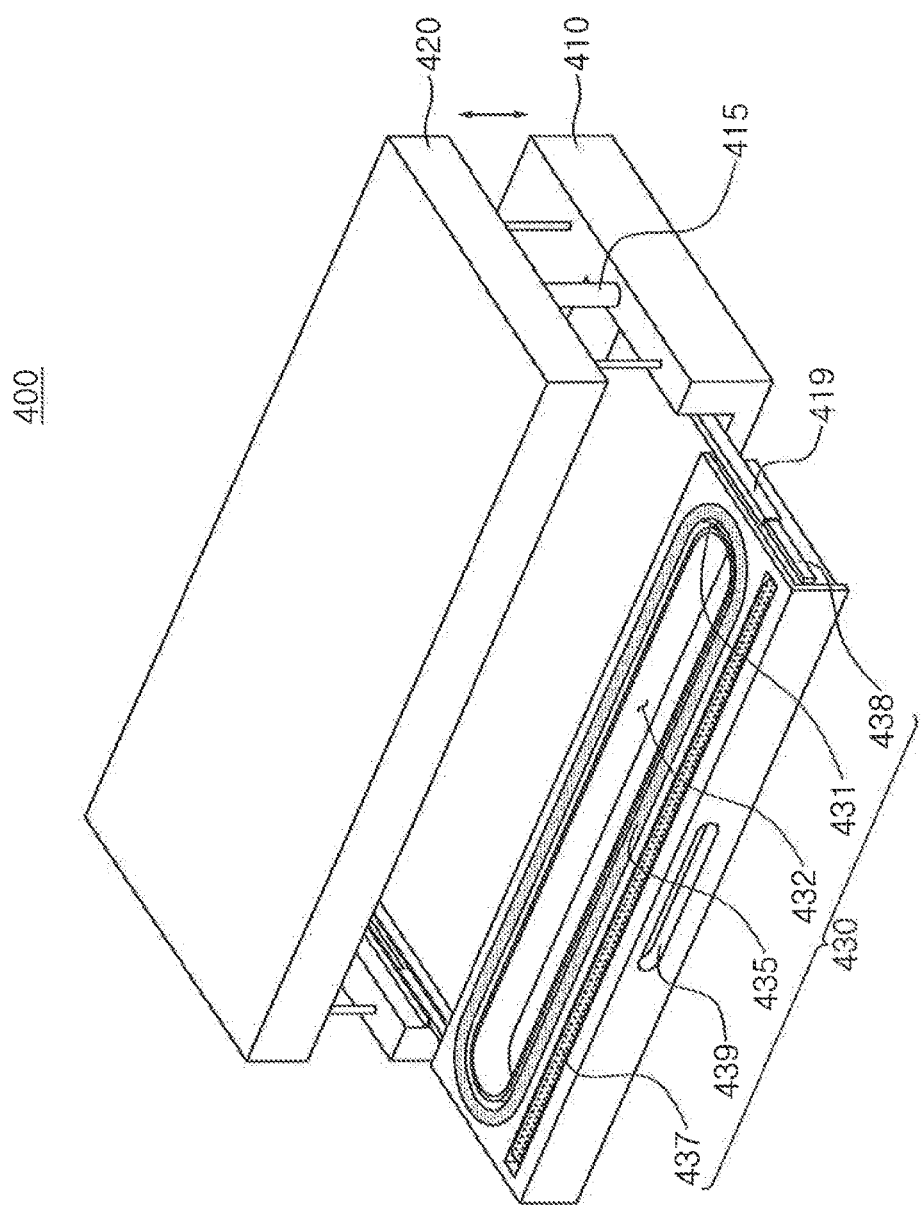
FIG. 5 is a view schematically illustrating a chamber unit separated from a device housing in a moisture-sensitive vacuum packing machine according to another embodiment of the present invention.
Figure 6:
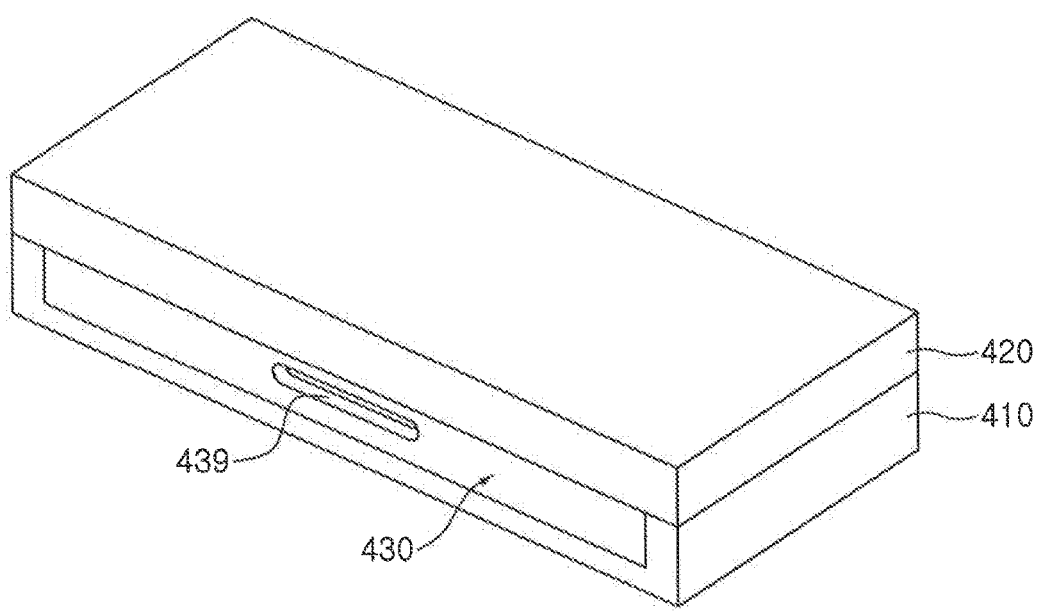
FIG. 6 is an assembled perspective view of the moisture-sensitive vacuum packing machine according to another embodiment of the present invention.

As illustrated in FIG. 5, a moisture-sensitive vacuum packing machine 400 according to the present embodiment includes a device housing 410, a cover 420, a chamber unit 430, a sensing unit, a controller, and a vacuum driving unit.

However, in the present embodiment, repeated descriptions with respect to the sensing unit, the controller, and the vacuum driving unit having the same structures and functions as those of any one of the first to third embodiments as described above will be omitted, and a structure of the device housing 410 and the cover 420 and a structure of the device housing 410 and the chamber unit 430 which are slightly different from those of the first embodiment as described above will be described.

In the moisture-sensitive vacuum packing machine 400 according to an embodiment of the present invention, the cover 420 is a member provided to hermetically seal the chamber unit 430 provided in an upper portion of the device housing 410, while moving up and down with respect to the device housing 410.

In the present embodiment, the cover 420 is a member provided to open and close the chamber unit 430, while moving up and down by cylinder members 415 provided on both sides of the device housing 410. The cylinder members 415 are associated with the vacuum driving unit, so that when the vacuum driving unit operates, the cylinder members 415 enable the cover 420 to be brought closely into contact with the device housing 410 as illustrated in FIG. 6.

In the case in which the cover 420 is associated with the device housing 410 by the cylinder members 415, even though the sensing unit senses moisture within the chamber unit 430, it may not be easy to remove moisture from within the chamber unit 430 because the cover 420 may not be separated from the device housing 410. Thus, in the present embodiment, the moisture-sensitive vacuum packing machine 400 according to the present embodiment employs a scheme in which the chamber unit 430 is detachably attached to the device housing 410 in a sliding manner.

The moisture-sensitive vacuum packing machine 400 according to an embodiment of the present invention is the same as those of the former embodiments as described above, in that the chamber unit 430 has the dual-chamber structure including the first chamber 431 and the second chamber 432 and a sensing unit (not shown) is provided between the first chamber 431 and the second chamber 432. However, the moisture-sensitive vacuum packing machine 400 according to the present embodiment is different from the former embodiments as described above, in that the chamber unit 430 is itself detachably attached to the device housing 410 in a sliding manner.

In the present embodiment, a chamber sealing member 435 having the same function as that of the chamber sealing member of the first embodiment as described above is provided on an upper surface of the chamber unit 430, and a hot wire 437 having the same function as that of the hot wire of the first embodiment is provided on the upper surface of the chamber unit 430.

In the present embodiment, guide bars 438 installed to operate along guide rails 419 provided in the device housing 410 in a sliding manner are disposed on both sides of the first chamber 431. Also, a handle recess 439 for easily pulling the first chamber 431 out of the device housing 410 is provided on a front surface of the first chamber 431.

In the case of the moisture-sensitive vacuum packing machine 400 according to the present embodiment of the present invention, when the sensing unit senses moisture within the chamber unit 430, the chamber unit 430 may itself be separated from the device housing 410 as illustrated in FIG. 5 to remove moisture from within the second chamber 432.

Fifth Embodiment

Figure 7A:
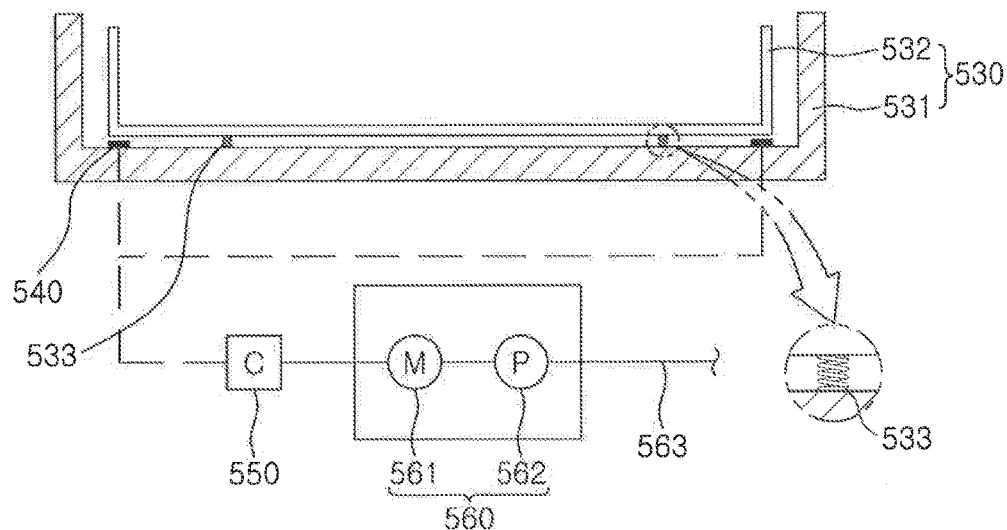
FIG. 7(a) is a view schematically illustrating another example of an internal structure of a chamber unit taken along line A-A' and connection relationships between a sensing unit, a controller, and a vacuum driving unit associated with the chamber unit.
Figure 7B:
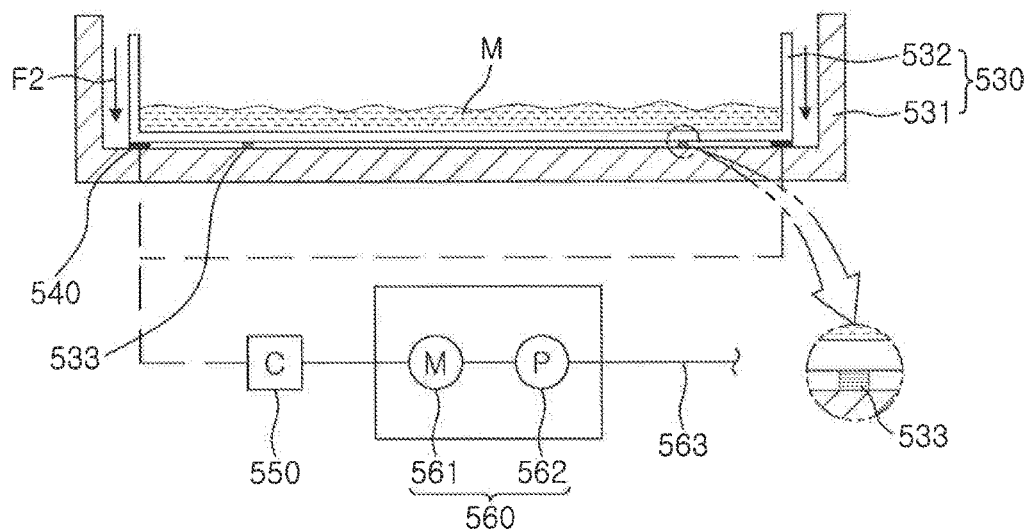
FIG. 7(b) is a view illustrating an operation when moisture is introduced to the chamber unit.

Hereinafter, a moisture-sensitive vacuum packing machine according to a fifth embodiment of the present invention will be described with reference to FIGS. 7(a) and 7(b). FIG. 7(a) is a view schematically illustrating another example of an internal structure of a chamber unit 530 taken along line A-A' and connection relationships between a sensing unit 540, a controller 550, and a vacuum driving unit 560 associated with the chamber unit 530, and FIG. 7(b) is a view illustrating an operation when moisture is introduced to the chamber unit.

As illustrated in FIG. 7(a), a moisture-sensitive vacuum packing machine 500 according to another embodiment of the present invention includes a device housing, a cover, a sensing unit 540, a controller 550, a vibration driving unit 560, and the like, which have the same structures and functions as those of the components of the first embodiment as described above, so a repeated description thereof will be omitted.

Hereinafter, a structure of the chamber unit 530 and an operating method of the sensing unit 540, slightly different from those of the chamber unit 130 and the sensing unit 140 of the first embodiment as described above, will be described.

As illustrated in FIG. 7(a), like the first embodiment, the chamber unit 530 according to the present embodiment may include a first chamber 531 and a second chamber 532, and the second chamber 532 may be accommodated in the first chamber 531.

In this case, the chamber unit 530 may further include an elastic support member 533 disposed between the first chamber 531 and a lower surface of the second chamber 532 accommodated in the first chamber 531 and elastically supporting the second chamber 532. When the elastic support member 533 is elastically deformed by a weight of moisture flowing into the second chamber 532, the second chamber 532 moves downwardly to come into contact with the sensing unit 540 installed in a lower portion of the second chamber 532.

Namely, in the present embodiment, the second chamber 532 is installed to be movable up and down within the first chamber 531, which may be implemented as the elastic support member 533 is installed to be elastically deformable on a lower surface of the second chamber 532.

Accordingly, as in the embodiment illustrated in FIG. 7(b), when moisture is introduced to the interior of the second chamber, the second chamber 532 may move downwardly due to the weight of the introduced moisture.

Meanwhile, the sensing unit 540 is installed on the internal bottom surface of the first chamber 531 and provided below the second chamber 532. The sensing unit 540 may come into contact with or be separated from the second chamber 532 as the second chamber 532 moves up and down.

Namely, when moisture is not introduced to the interior of the second chamber 532, the sensing unit 540 may be separated from the lower surface of the second chamber 532. Meanwhile, when moisture is introduced to the interior of the second chamber 532, the second chamber 532 may move in a downward direction due to a weight of the introduced moisture and deformation of the elastic support member 533, and at this time, the sensing unit 540 may come into contact with the lower surface of the second chamber 532.

Accordingly, as the sensing unit 540 comes into contact with the second chamber 532, it may sense moisture introduced to the second chamber 532. In the present embodiment, the sensing unit 540 may operate when it comes into contact with the second chamber 532, and may be electrically connected to the controller 550.

Meanwhile, when the sensing unit 540 and the second chamber 532 are in contact with each other, the controller 550 may stop the operation of the vibration driving unit 560. Also, the controller 550 may be associated with a vacuum motor to control an operation of the vacuum motor 561.

Namely, when the second chamber 532 and the sensing unit 540 come into contact with each other according to a movement of the second chamber 532 up and down as described above, the controller 550 may determine that moisture exists in the second chamber 532, display information regarding the presence of moisture within the chamber unit 530 on a display window, and stop an operation of the vacuum driving unit 560.

Sixth Embodiment

Figure 8A:
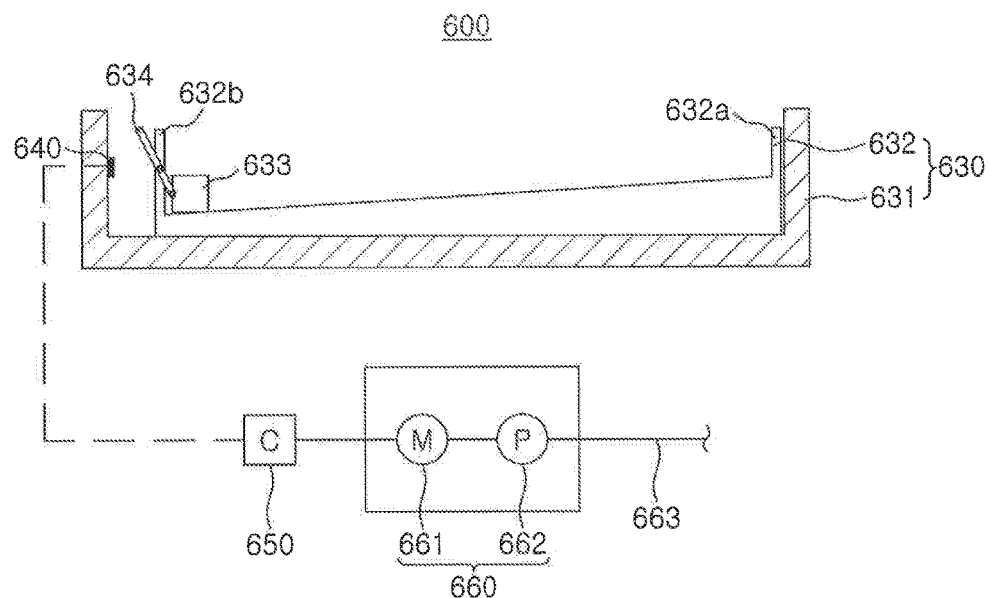
FIG. 8(a) is a view schematically illustrating another example of an internal structure of a chamber unit taken along line A-A' and connection relationships between a sensing unit, a controller, and a vacuum driving unit associated with the chamber unit.
Figure 8B:
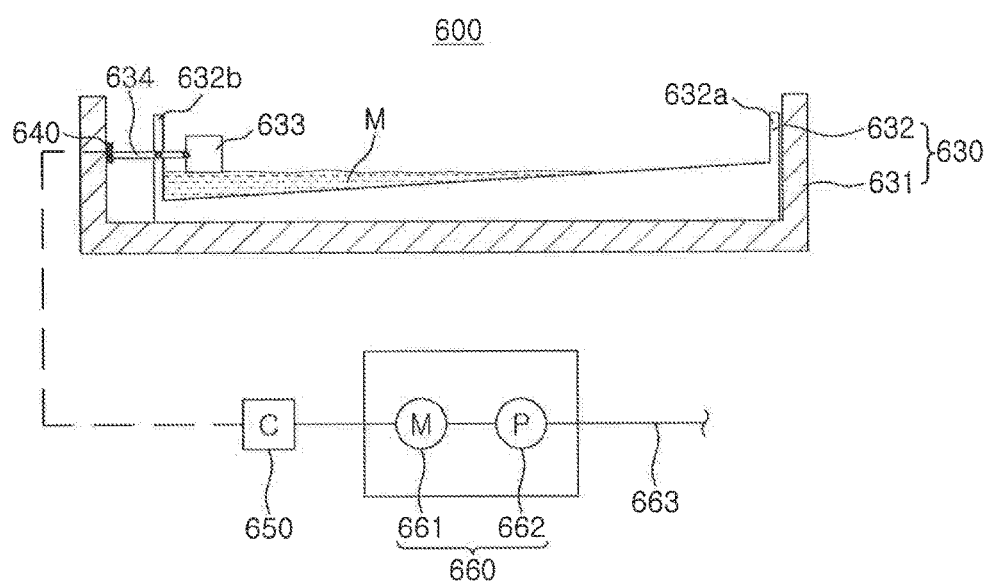
FIG. 8(b) is a view illustrating an operation when moisture is introduced to the chamber unit.

Hereinafter, a moisture-sensitive vacuum packing machine according to a sixth embodiment of the present invention will be described with reference to FIGS. 8(a) and 8(b). FIG. 8(a) is a view schematically illustrating another example of an internal structure of a chamber unit 630 taken along line A-A' and connection relationships between a sensing unit 640, a controller 650, and a vacuum driving unit 660 associated with the chamber unit 630, and FIG. 8(b) is a view illustrating an operation when moisture is introduced to the chamber unit.

As illustrated in FIG. 8(a), a moisture-sensitive vacuum packing machine 600 according to another embodiment of the present invention may include a device housing including a controller 650 and a vacuum driving unit 660, a chamber unit 530 positioned above the device housing and including a first chamber 631 and a second chamber 632 having the interior vacuumized when the vacuum driving unit 660 operates, and a sensing unit 640 associated with the controller 650 and installed on the chamber unit 630 sense the presence or absence of moisture within the second chamber 632.

Here, in the present embodiment, the device housing, the cover, the sensing unit 640, the controller 650 and the vacuum driving unit 660 have the same structures and functions as those of the components of the first embodiment as described above, so a repeated description thereof will be omitted.

Hereinafter, a structure of the chamber unit 630 and an operating method of the sensing unit 640, which are slightly different from those of the chamber unit 130 and the sensing unit 140 of the first embodiment as described above, will be described.

In the present embodiment, as illustrated in FIG. 8(a), the chamber unit 630 may include a buoyancy member 633 provided within the second chamber 632 and moving up and down according to a height of moisture M introduced to the second chamber 632, and an operating bar 634 hinge-coupled to the second chamber 632 and having one end connected to the buoyancy member 633 and the other end which comes into contact with or is separated from the sensing unit 640 according to a movement of the buoyancy member 633.

In this case, the buoyancy member 633 may be made of a material such as Styrofoam, or the like, that may be buoyant when moisture M is introduced to the interior of the second chamber 632. However, a shape and a material of the buoyancy member 633 are not limited to the illustrated case and the buoyancy member 633 may be variously modified as long as it is buoyant by moisture M introduced to the second chamber 632 and moves upwardly.

Meanwhile, as in the illustrated embodiment, the operating bar 634 may be hinge-coupled to the second chamber 63. In association with the buoyancy member 633, the operating bar 634 may operate according to a movement of the associated buoyancy member 633 to come into contact with or be separated from the sensing unit 640 installed within the first chamber 631.

However, the operating bar 634 is limited to the illustrated structure and may be variously modified as long as it may be separated from or come into contact with the sensing unit 640 in association with the buoyancy member 633. For example, the operating bar 634 may be hinge-coupled to an upper end of one side or the other side of the second chamber 632.

Meanwhile, the second chamber 632 may have an internal bottom surface downwardly sloped from one side 632a of the second chamber 632 to the other side 632b thereof such that moisture M within the chamber 632 may readily flow in any one direction, and the buoyancy member 633 may be positioned on the other side 632b within the second chamber 632.

Namely, like the first embodiment as described above, the second chamber 632 may have an internal bottom surface downwardly sloped from one side 632a of the second chamber 632 to the other side 632b thereof such that water introduced to the interior of the second chamber 632 to readily flow in any one direction. The buoyancy member 633 may be positioned on the other side 632b of the second chamber 632. Thus, since the introduced moisture M gathers on the other side 632b of the second chamber 632, moisture can be more easily sensed according to ascending or descending of the buoyancy member 633.

In detail, when moisture M is introduced to the second chamber 632, the moisture M may move to the other side 632b of the second chamber 632 along the sloped surface of the internal bottom surface within the second chamber 632. Also, when the buoyancy member 633 ascends due to the introduced moisture and buoyancy, the operating bar 634 associated with the buoyancy member 633 comes into contact with the sensing unit 640 according to a hinge operation to sense moisture within the second chamber 632.

In this case, when the sensing unit 640 and the operating bar 634 are in contact with each other, the controller 650 may stop the operation of the vacuum driving unit 660.

Namely, when the operating bar 634 and the sensing unit 640 are in contact according to the hinge operation of the operating bar 634, the controller 650 may determine that moisture exists within the second chamber 632, display information regarding the presence of moisture within the chamber unit 630 on a display window, or may stop the operation of the vacuum driving unit 660.

Seventh Embodiment

Hereinafter, a moisture-sensitive vacuum packing machine according to a seventh embodiment will be described with reference to FIGS. 9 through 12.

The moisture-sensitive vacuum packing machine according to the present embodiment may further include a pressure sensor 700 associated with the chamber units of the first embodiment to the sixth embodiment as described above and sensing or measuring air pressure to sense vacuum of the chamber units.

Figure 9:
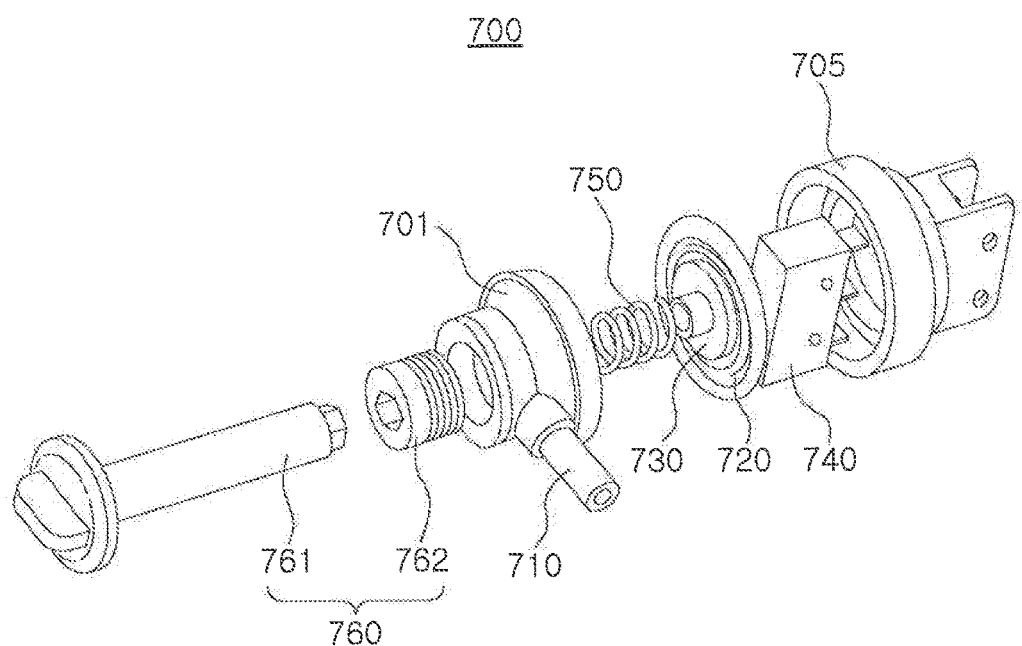
FIG. 9 is an exploded perspective view of a pressure sensor applied to a moisture-sensitive vacuum packing machine according to an embodiment of the present invention.
Figure 10:
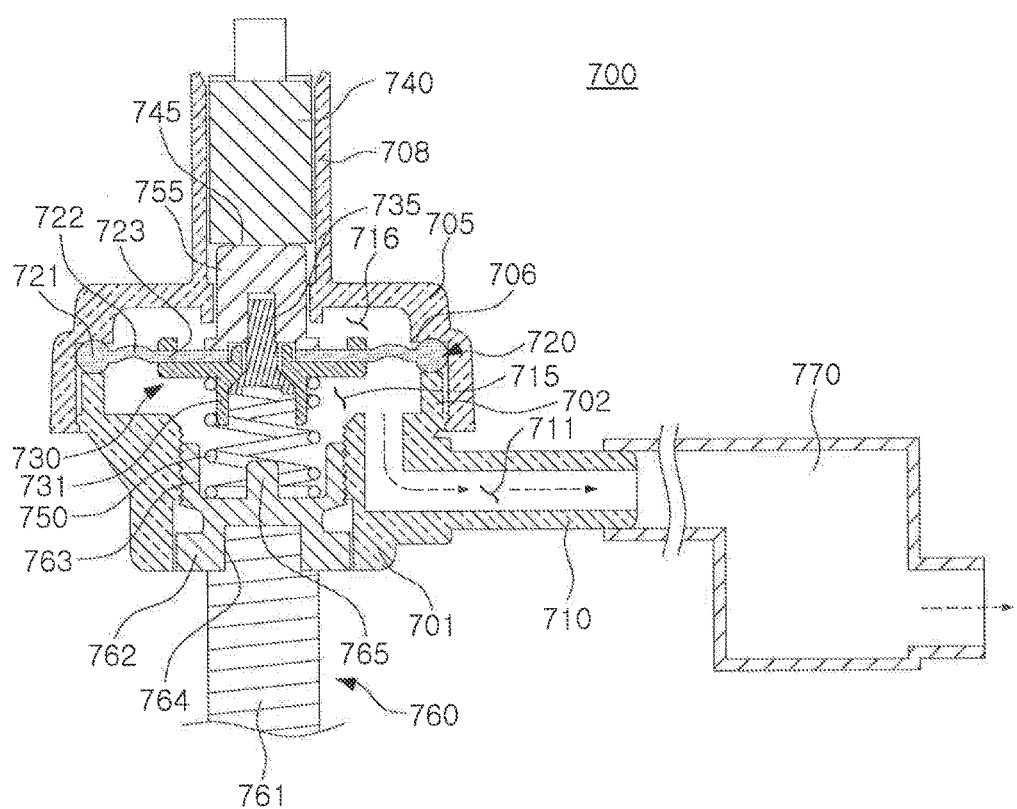
FIG. 10 is a cross-sectional view of the pressure sensor of FIG. 9 when pressure is not applied.
Figure 11:
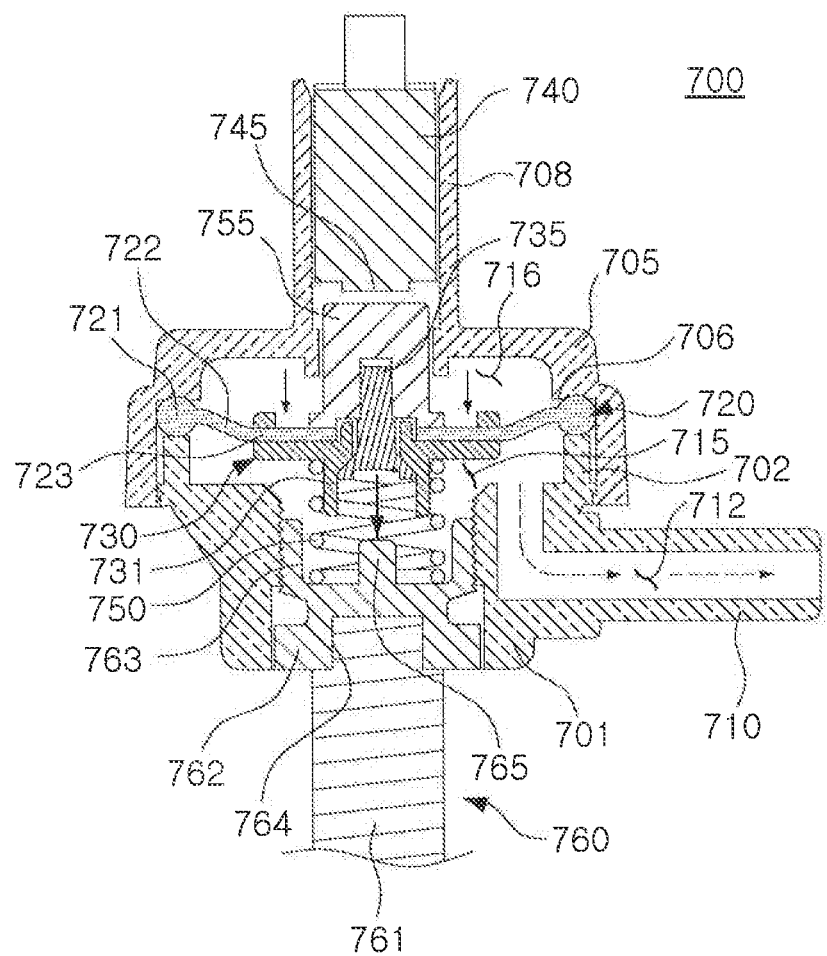
FIG. 11 is a cross-sectional view of the pressure sensor of FIG. 9 when negative pressure is applied.
Figure 12:
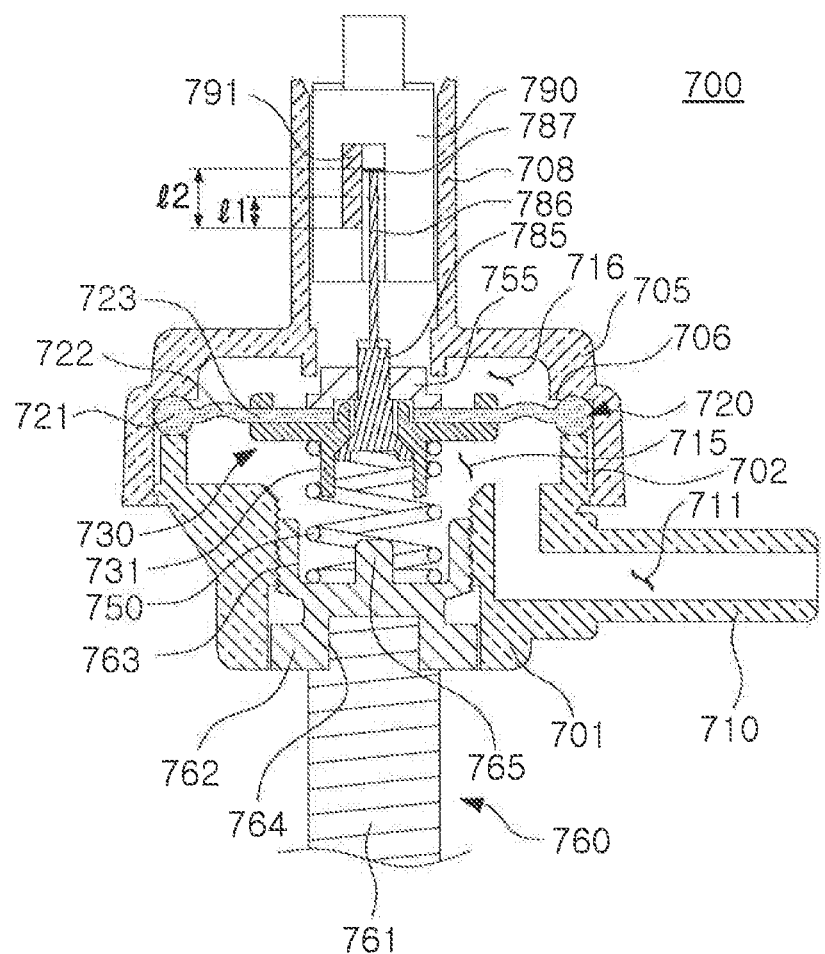
FIG. 12 is an exploded perspective view of a pressure sensor applied to a moisture-sensitive vacuum packing machine according to another embodiment of the present invention.
Figure 13:
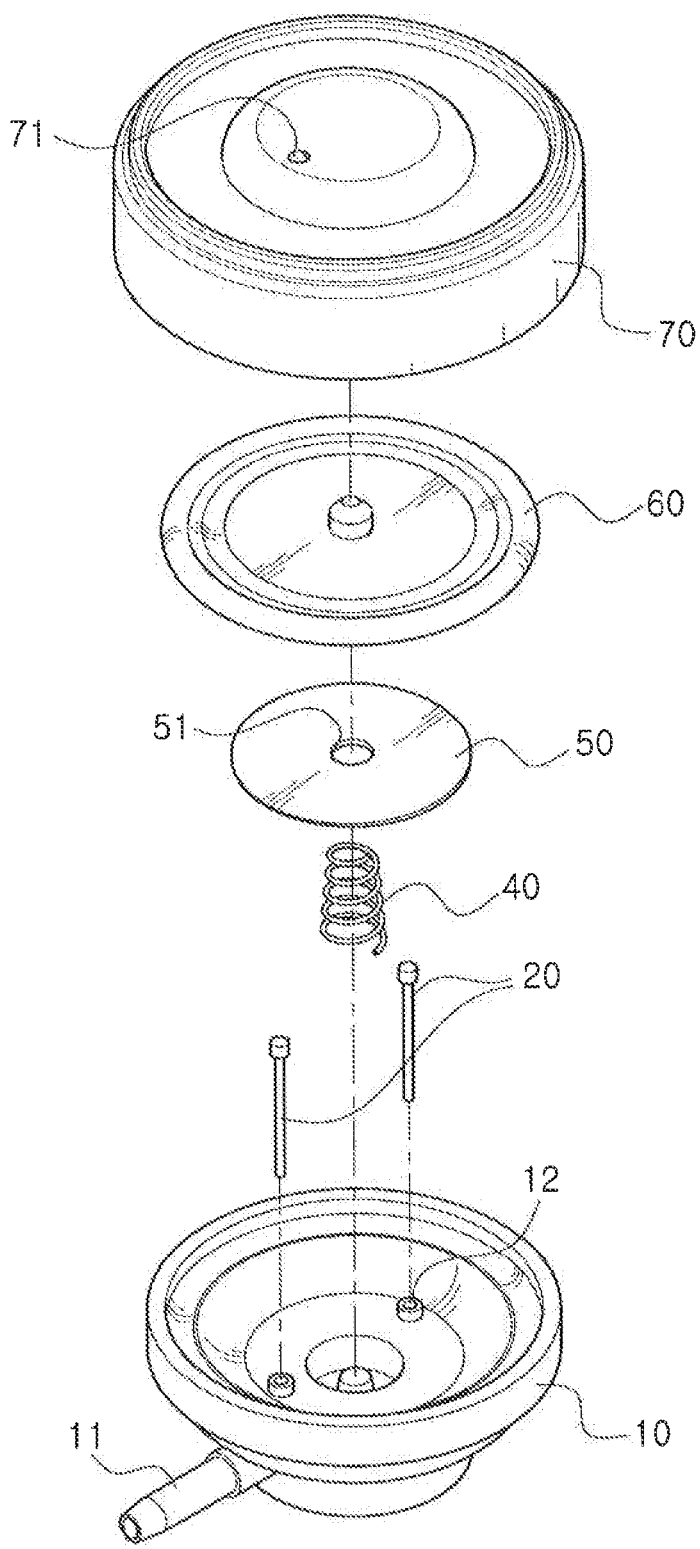
FIG. 13 is an exploded perspective view of a related art pressure sensor.

FIG. 9 is an exploded perspective view of a pressure sensor applied a moisture-sensitive vacuum packing machine according to an embodiment of the present invention, FIG. 10 is a cross-sectional view of the pressure sensor of FIG. 9 when pressure is not applied, and FIG. 11 is a cross-sectional view of the pressure sensor of FIG. 9 when negative pressure is applied. FIG. 12 is an exploded perspective view of a pressure sensor applied to a moisture-sensitive vacuum packing machine according to another embodiment of the present invention.

Referring to FIG. 9, in a pressure sensor 700 according to an embodiment of the present invention, a sealing member 720 is disposed between an upper housing 705 and a lower housing 701, and a fixing member 730 is installed in a central portion of the sealing member 720. An elastic member 750 is positioned between the fixing member 730 and the lower housing 701, and an operation sensing unit 740 is positioned on the opposite side of the elastic member 750 with the sealing member 720 interposed therebetween. The operation sensing unit 740 may be coupled to the upper housing 705 through a coupling unit such as a bolt, or the like.

The lower housing 701 includes an air communicating unit 710, and a adjusting member 760 is connected to the lower housing 701. The adjusting member 760 includes a driving portion 761 and a moving portion 762, and elastic force of the elastic member 750 may be regulated by bringing the elastic member 750 into contact with an end portion of the moving portion 762 and manipulating the driving portion 761.

FIG. 10 is a cross-sectional view of the pressure sensor 700 according to an embodiment of the present invention.

As illustrated in FIG. 10, in the present embodiment, housings include the upper housing 705 and the lower housing 701, and the upper housing 705 and the lower housing 701 form an internal space portion.

In the present embodiment, the lower housing 701 is inserted into the upper housing 705. The lower housing 701 has a pressing protrusion 702 inserted into the upper housing 705, and the upper housing 705 has a pressing recess 706 formed in a portion corresponding to the pressing protrusion 702. An edge portion 721 of the sealing member 720 is inserted between the pressing protrusion 702 and the pressing recess 706, and accordingly, the edge portion 721 of the sealing member 720 is fixed to the housings.

The lower housing 701 includes the air communicating unit 710 connecting the space portion formed by the upper housing 705 and the lower housing 701 to an external chamber unit 770. The air communicating unit 710 communicates with the chamber unit 770 through a connection unit allowing fluid to flow therein, such as a tube, or the like. Thus, through the air communicating unit 710 and a flow path 711, pressure in a lower region 715 of the space portion and that in the chamber 770 are equal all the time.

Meanwhile, the space portion formed by the lower housing 701 and the upper housing 705 is divided into two regions, i.e., an upper region 716 and the lower region 715 by the sealing member 720 whose edge portion 721 is fixed to the lower upper housing 705 and the lower housing 701.

The upper region 716 communicates with the exterior through a gap between the operation sensing unit 740 and the upper housing 705 so as to be constantly maintained at atmospheric pressure, and the lower region 715 communicates with the chamber unit 770 through the air communicating unit 710 so as to be constantly maintained at a pressure equal to that of the chamber unit 770. Thus, when negative pressure is applied to the chamber unit 770 by a vacuum pump (not shown), a pressure difference between the upper region 716 and the lower region 715 occurs, moving a central portion 723 of the sealing member 720.

Referring back to the description of the sealing member 720, the sealing member 720 includes the edge portion 721 fixed by the upper and lower housings 705 and 701, a creased connection portion 722 that may elongate, and the central portion 723. The force is applied due to a pressure difference between the upper region 716 and the lower region 715, the creases of the connection portion 722 are smoothed out and the central portion 723 is moved to a side to which negative pressure is applied.

Meanwhile, the fixing member 730 is inserted into the central portion 723 of the sealing member 720 toward the lower region 715. A method for inserting the fixing member 730 is not limited, and in the present embodiment, a plurality of holes are formed in the central portion 723 and a portion of the fixing member 730 is insertedly fixed thereto, thus installing the fixing member 730 on the sealing member 720.

The fixing member 730 includes a protrusion 731 protruded toward the lower housing 701, and as the elastic member 750 is inserted into the protrusion 731, the elastic member 750 is maintained in a home position. The fixing member 730 serves to evenly transfer elastic force of the elastic member 750 to the sealing member 720 and enable the elastic member 750 to be maintained in the home position thereof.

Also, a pressing member 755 is installed in the central portion 723 of the sealing member 720 toward the upper region 716. The pressing member 755 is connected and fixed through the fixing member 730 and the connection member 735. The pressing member 755 serves to press a switch of the operation sensing unit 740 when force is not applied to the sealing member 720.

The adjusting member 760 is installed in a position corresponding to the fixing member 730, and the elastic member 750 is disposed between the adjusting member 760 and the fixing member 730. The adjusting member 760 includes the moving portion 762 and the driving portion 761. The moving portion 762 is screw-coupled to the lower housing 701 to ascend or descent along a thread according to an operation of the driving portion 761 to adjust elastic force of the elastic member 750.

The moving portion 762 and the driving portion 761 of the adjusting member 760 are connected by a connection recess/protrusion 764, and rotary power of the driving portion 761 is transferred to the moving portion 762. Also, the moving portion 762 includes a recess 763 accommodating the elastic member 750, and a protrusion 765 is formed in the recess 763 to maintain the elastic member 750 in a home position.

Meanwhile, the operation sensing unit 740 is fixed to a fixing portion 708. A predetermined gap may be formed between the operation sensing unit 740 and the upper housing 705, and accordingly, the upper region 710 may communicate with the exterior. If a gap is not formed, a communication hole may be installed in the upper housing 705.

Preferably, the operation sensing unit 740 may cut off or connect power through an operation of a micro-switch. In the embodiment illustrated in FIGS. 9 to 11, a micro-switch is used as the operation sensing unit 740, and as described above, when negative pressure is not applied, namely, when a pressure level is equal to or more than predetermined pressure, the switch 745 of the operation sensing unit 740 is pressed by the pressing member 755.

FIG. 11 is a cross-sectional view of the pressure sensor 700 when negative pressure is applied to the chamber unit 770 (please see FIG. 10). As illustrated in FIG. 11, when negative pressure is applied to the chamber unit 770 (please see FIG. 10), negative pressure is also applied to the lower region 715 through the flow path 711 of the air communicating unit 710.

Since the upper region 716 is constantly maintained at atmospheric pressure, the sealing member 720, overcoming elastic force of the elastic member 750, is moved downwardly due to a pressure difference between the upper region 716 and the lower region 715. If the pressure difference is smaller than the elastic force of the elastic member 750, the sealing member 720 is not moved in spite of the pressure difference. Thus, pressured desired to be sensed may be adjusted by adjusting the elastic force of the elastic member 750 with the adjusting member 760.

When the sealing member 720 is moved downwardly, the fixing member 730, the connection member 735, and the pressing member 755 fixed to the sealing member 720 are moved together, and the switch 745 pressed by the pressing member 755 is released due to the movement of the pressing member 755. Accordingly, the operation sensing unit 740 senses negative pressure equal to or higher than a predetermined level applied to the chamber unit 770 (please see FIG. 10).

In this manner, in the present embodiment, the pressure sensor 700 capable of sensing desired pressure through a simple configuration is provided. In particular, since the operation sensing unit 740 sensing an operation and the flow path 711 are formed in different regions, moisture or foreign objects that flow backwards from the chamber unit 770 (please see FIG. 10) do not affect the operation sensing unit 740. Thus, the operation sensing unit 740 may stably sense pressure any time.

Also, the connection relationships of the components are simple and assembling thereof is simplified, thus saving time and resources required for manufacturing the pressure sensor according to an embodiment of the present invention.

FIG. 12 illustrates another embodiment of the present invention.

The embodiment of FIG. 12 is the same as the embodiments of FIGS. 8 through 11, except for components of an operation sensing unit 790, the pressing member 755, and a connection member 785, so only the different components will be described.

In the embodiment of FIG. 12, the pressing member 755 is merely used to fix the connection member 785, and does not come into contact with the operation sensing unit 790. The operation sensing unit 790 is a variable resistor sensor calculating pressure by a current value using a variable resistor 791.

The member 785 includes an extending portion 786 extending to the operation sensing unit 790, and the extending portion 786 is connected to a variable resistor connection portion 787 of the operation sensing unit 790. Accordingly, when the sealing member 720 is moved downwardly, the extending portion 786 and the variable resistor connection portion 787 are moved together, and thus, a length of the of the variable resistor 791 is changed, namely, from $l_2$ at an initial stage to $l_1$, and a current value changing accordingly is measured by the operation sensing unit 790.

The measurement of a current value using the variable resistor 791 has been widely known as a technique used in various fields, so a description of a detailed configuration thereof within the operation sensing unit 790 will be omitted.

In this manner, in the case of the embodiment of FIG. 12, a movement distance of the sealing member 720 may be measured through the operation sensing unit 790, and thus, internal pressure of the chamber unit 770 (please see FIG. 10), as well as whether pressure has exceeded a predetermined pressure level, may be directly recognized.

Also, since the operation sensing unit 790 in which a current flows is sealed by the sealing member 720, a trouble due to moisture of the chamber unit 770 cannot be generated.

The present invention has been described through specific embodiments thereof, but the present invention is not limited to the foregoing embodiments.

While the present invention has been shown and described in connection with the embodiments, it will be apparent to those skilled in the art that modifications and variations can be made without departing from the spirit and scope of the invention as defined by the appended claims.

MODE FOR INVENTION

Industrial Applicability

[Sequence List Text]

The invention claimed is:

1. A moisture-sensitive vacuum packing machine comprising:
    a device housing having a controller and a vacuum driving unit;
    a chamber unit positioned above the device housing and having a first chamber and a second chamber whose interiors are vacuumized when the vacuum driving unit operates; and
    a sensing unit installed in the chamber unit such that it is associated with the controller, and sensing the presence or absence of moisture within the second chamber according to whether the sensing unit comes into contact with the second chamber,
    wherein the sensing unit senses moisture through a seesaw movement due to moisture introduced to the second chamber,
    wherein the chamber unit comprises:
    a first chamber having a chamber fixing shaft provided on a bottom surface thereof and a moisture inflow opening provided on an upper surface thereof;
    a connection bar associated with the chamber fixing shaft such that it can make the seesaw movement;
    a second chamber fixed to one end of the connection bar such that the second chamber is positioned below the moisture inflow opening, to accommodate moisture introduced through the moisture inflow opening; and
    a balance weight provided in the other end of the connection bar such that it can come into contact with the sensing unit.

2. The moisture-sensitive vacuum packing machine of claim 1, wherein the second chamber is moved downwardly due to a weight of moisture introduced through the moisture inflow opening, and
    the balance weight is moved upwardly immediately when the second chamber is moved downwardly, so as to be released from contact with the sensing unit.

3. The moisture-sensitive vacuum packing machine of claim 2, wherein when the sensing unit and the balance weight are released from a contact state, the controller operates to stop an operation of the vacuum driving unit.

4. The moisture-sensitive vacuum packing machine of claim 1, further comprising a cover having a vacuum intake associated with the vacuum driving unit, and associated with the device housing to move up and down with respect to the device housing when the vacuum driving unit operates.

5. The moisture-sensitive vacuum packing machine of claim 4, wherein the chamber unit is detachably associated with the device housing in a sliding manner.

6. The moisture-sensitive vacuum packing machine of claim 1, further comprising a pressure sensor associated with the chamber unit and sensing or measuring air pressure to sense vacuum of the chamber unit.

7. The moisture-sensitive vacuum packing machine of claim 6, wherein the pressure sensor comprises:
    a housing configured to have a space portion formed therein;
    a sealing member having an edge portion fixed to the housing and dividing the space portion within the housing into two or more separated regions and configured as an elastic member;
    an air communicating unit allowing one region of the space portion and a pressure measurement unit to communicate with each other, and connected to the housing; and
    an operation sensing unit disposed in the other region of the space portion of the housing and sensing a movement of a central portion of the sealing member according to a change in pressure of the one region of the space portion communicating with the pressure measurement unit.

8. The moisture-sensitive vacuum packing machine of claim 7, further comprising an elastic member disposed between the sealing member and the housing at the one region side to move the sealing member when pressure of the pressure measurement unit is equal to or lower than a pre-set pressure level,
    wherein the sealing member comprises a fixing member configured to fix a position of the elastic member to the central portion.

9. The moisture-sensitive vacuum packing machine of claim 8, wherein the sealing member divides the space portion into an upper region and a lower region,
    the air communicating unit communicates with the lower region,
    the operation sensing unit is a micro-switch disposed in the upper region of the housing, and
    the sealing member comprises a pressing member configured to press the micro-switch of the operation sensing unit when pressure of the pressure measurement unit is equal to or higher than the pre-set pressure level.

10. The moisture-sensitive vacuum packing machine of claim 8, wherein the sealing member divides the space portion into an upper region and a lower region,
    the air communicating unit communicates with the lower region,
    the operation sensing unit is disposed in the upper region of the housing, and
    the sealing member is integrally moved together with a variable resistor of the operation sensing unit so that the operation sensing unit senses pressure through a current value that passes through the variable resistor.

11. The moisture-sensitive vacuum packing machine of claim 8, further comprising an adjusting member adjusting elastic force of the elastic member.

12. The moisture-sensitive vacuum packing machine of claim 8, wherein the housing is formed as a first housing member and a second housing member are coupled, and
    the sealing member is fixed between the first housing member and the second housing member.

13. The moisture-sensitive vacuum packing machine of claim 11, wherein the adjusting member comprises a moving portion supporting one side of the elastic member and screw-coupled to the housing, and a driving portion connected to the moving portion and rotating the moving portion by external force.

14. The moisture-sensitive vacuum packing machine of claim 8, wherein the sealing member comprises an edge portion fixed to the housing; a central portion moved according to pressure and a connection portion connecting the edge portion and the central portion and having creases to secure a movement distance of the central portion.

* * * * *